Feb. 16, 1971     C. O. SCHMIDT, JR     3,562,854
ANIMAL RESTRAINING APPARATUS
Filed Dec. 30, 1968                      2 Sheets-Sheet 2
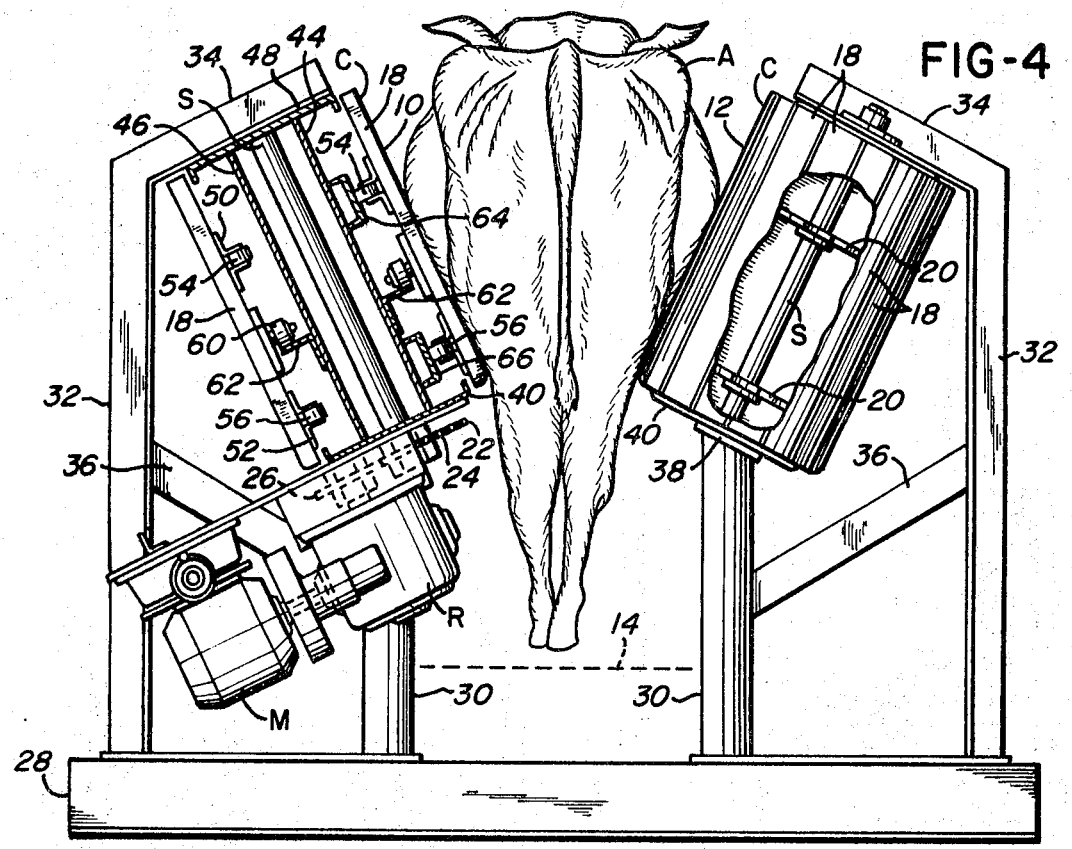
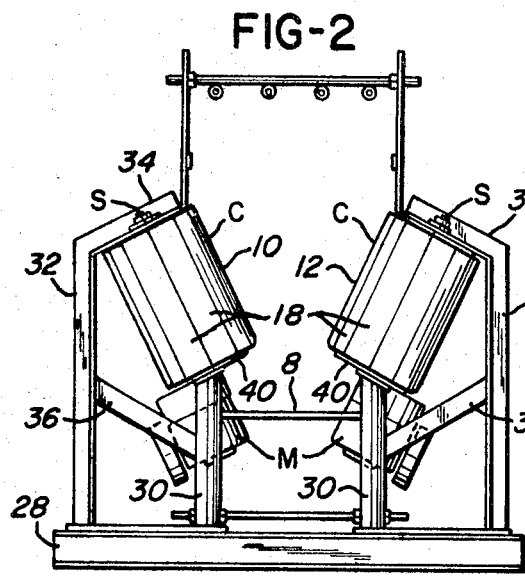
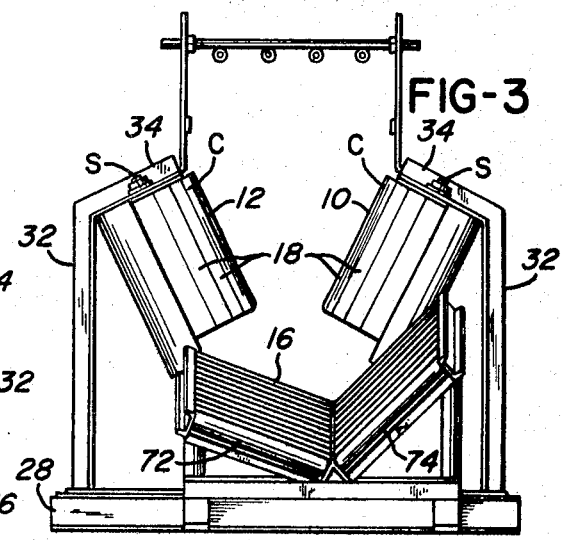
INVENTOR
CARL OSCAR SCHMIDT, JR.

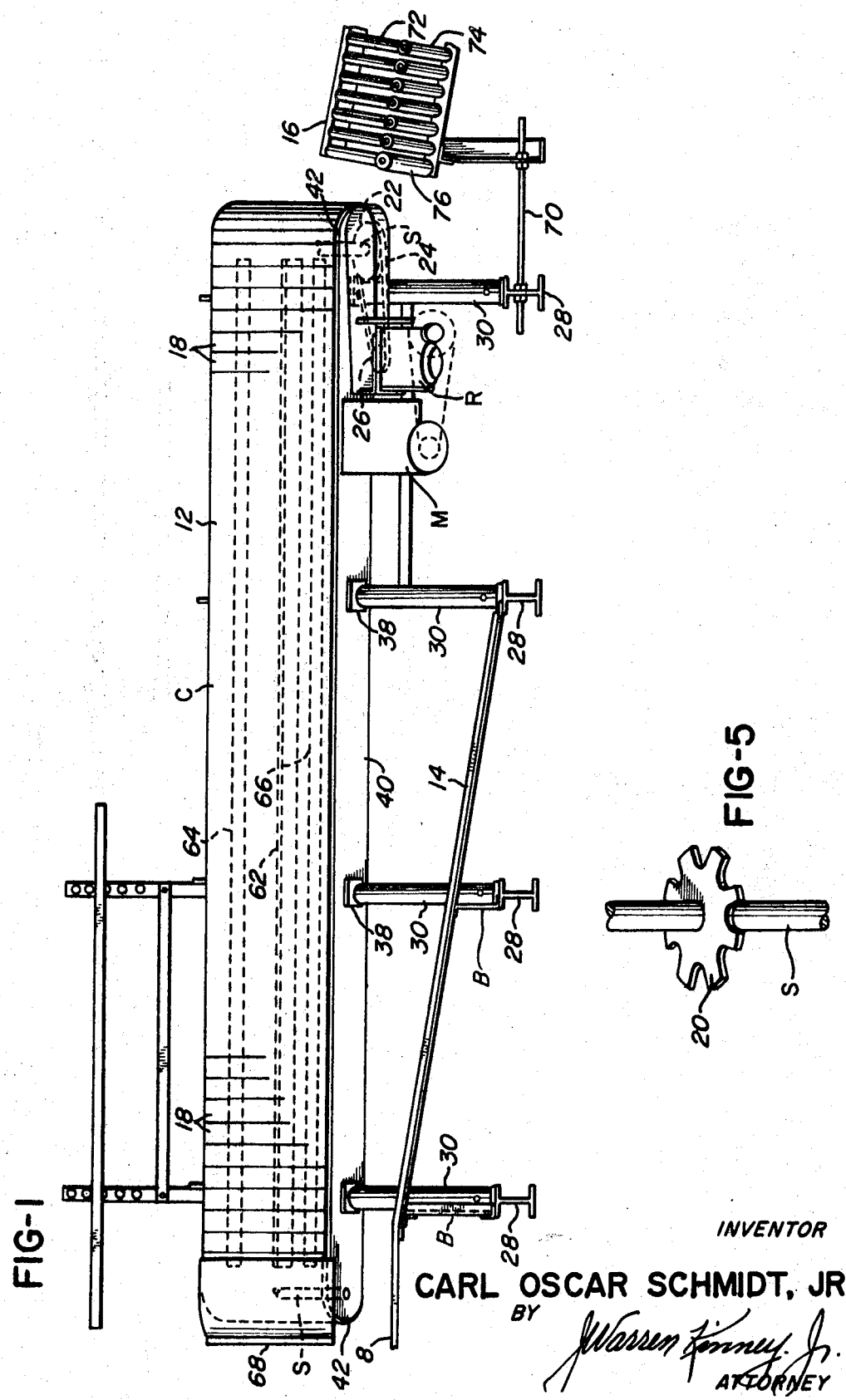

United States Patent Office 3,562,854
Patented Feb. 16, 1971

3,562,854
ANIMAL RESTRAINING APPARATUS
Carl Oscar Schmidt, Jr., Cincinnati, Ohio, assignor to The Cincinnati Butchers' Supply Company, Cincinnati, Ohio, a corporation of Ohio
Filed Dec. 30, 1968, Ser. No. 787,734
Int. Cl. A22b 1/00
U.S. Cl. 17—1                                                    18 Claims

ABSTRACT OF THE DISCLOSURE

The animal restraining apparatus is designed to permit a large meat animal to walk, more or less normally, toward the stunning or sticking station of an abbatoir; in the course of travel, the floor gradually leaves the hoofs, and moving conveyors at opposite sides of the animal gently assume support of the entire weight of the animal at the belly, while at the same time confining and immobilizing the four legs, so that the animal is brought without delay or extra effort, into perfect position for stunning or sticking.

---

This invention relates to an animal restraining apparatus for use in the killing section of a meat packing plant.

The purpose of the apparatus is to facilitate bringing large meat animals on the hoof, to a station in the packing plant or abattoir, where the animals are to be first stunned and then stuck and bled preparatory to further processing in the production of meat. The handling of large animals at this stage has always presented a problem due to the size, weight and intractability of such large animals under the unfamiliar environment to which they are here subjected.

According to the present invention, the animal being directed to the stunning station is allowed, rather normally, to walk, although to a certain extent restrained, until it reaches a point of advancement where the floor gradually and almost imperceptibly falls from the reach of the animal's hoofs, whereupon moving conveyors at opposite sides of the animal come into play for gently supporting the entire weight of the animal at its sides and belly, while at the same time functioning to immobilize the four legs so that the animal is thereby completely subdued for easy, accurate, and timely stunning or sticking.

An object of the invention, therefore, is to facilitate presentation of large living meat animals to the stunning or sticking station, with a minimum of effort, and no interference at all with a prescribed production schedule. Heretofore, unruly animals were capable of upsetting and delaying processing schedules, with resulting inconvenience, added labor, and expense of processing.

Another object of the invention is to provide improved apparatus for the purpose stated, which is highly durable, simple, and effective in its operation, requiring little if any maintenance attention for long periods of time, and assuring maximum safety for the butcher and other persons employed at the stunning and/or sticking station.

A further object of the invention is to provide apparatus of the character and for the purpose stated, which eliminates undesirable bruising of the flesh of the animal in being carried to and from the stunning station.

The foregoing and other objects are attained by the means described herein and illustrated upon the accompanying drawings, in which:

FIG. 1 is a side elevational view of the animal restraining apparatus of the present invention.

FIG. 2 is an end elevation of the same, looking from left to right.

FIG. 3 is an end elevation of FIG. 1, looking from right to left, the drive means being omitted.

FIG. 4 is a view similar to FIG. 2, in greater detail and parts being broken away, showing an animal supported by the apparatus.

FIG. 5 is a detail view of a drive shaft and sprocket.

In FIG. 1, the reference numeral 8 indicates a walkway, which leads an animal on the hoof to the space between a pair of laterally inclined spaced reaches 10 and 12 of the conveyors C, C, located above the level of the walkway. The reaches 10 and 12 of the conveyors are downwardly convergent toward the runway, as best illustrated by FIG. 2, so as to be capable of supporting opposite sides of the belly of an animal A as the animal advances along the gradually declining section 14 of the walkway, where the hoofs of the animal eventually fail to reach the runway, causing the conveyors to assume the full weight of the animal. This, of course, restrains the animal to immobilize it, so that the animal may easily be stunned and/or stuck before leaving the conveyors C, C. Upon leaving the conveyors C, C, the limp body of the animal is deposited upon a discharge conveyor 16 which carries the animal forward for further treatment or processing.

Each of the conveyors C may be considered an endless belt constituted preferably of many parallel hardwood slats 18 flexibly connected along their inclined side edges, so that the reaches 10 and 12 may be moved in a common direction, at equal speeds of advancement, to deposit the animal body upon discharge conveyor 16. For this purpose, the conveyors are driven by means of electric motors M, M, which through speed reducers R, R, rotate the drive shafts S, S of the conveyors C, C at equal rates of speed. The drive shafts carry sprockets 20 for driving the conveyors C, C. As shown by FIG. 4, the drive shaft S may carry a sprocket 22 driven by a chain 24 which is trained over a sprocket 26 fixed upon the main shaft of speed reducer R. As FIG. 2 suggests, each conveyor C may have its own individual drive means; however, a single driving means common to the conveyors C, C, could be employed if desired.

The entire apparatus may be supported upon a set of I-beams such as 28, or if preferred, it may rest directly upon a suitable floor. The framework for the apparatus may comprise an inner rigid frame and an outer rigid frame of substantial length, the inner frame providing support for the walkway 8–14, and for the major portion of the weight of conveyors C, C. The inner frame may include pairs of upright spaced posts 30, 30 resting upon the beams 28 and adapted to support the conveyors C, C from beneath.

The outer frame may comprise pairs of upright stanchions 32, 32 (FIG. 2), spaced apart a greater distance than posts 30, 30 and having inwardly turned headers or arms 34, 34 which overlie and support the uppermost portions of conveyors C, C. The outer frame stanchions may rest upon the beams 28, and may be braced from the inner frame posts by means of struts or braces 36.

Intermediate the ends of each of the posts 30 is a suitable bracket or brace B or the like welded or otherwise suitably fixed to the posts and to the walkway 8–14 to support the walkway in operative position.

Upon the upper end of each line of posts 30 is fixed a rigid pad 38, and these pads support a long rigid plate 40 which extends substantially the full length of the conveyors. Plate 40 may be welded or otherwise fixed upon the upper ends of a line of posts 30, and its opposite ends 42 may be rounded in conformity with the conveyor ends. It will be understood that two such plates 40 are provided, each being supported upon a line of posts 30. The plates 40 slope outwardly and downwardly from a vertical plane which bisects the machine lengthwise.

As is best illustrated by the cut-away portion of FIG. 4, the plate 40 supports on its upper face a pair of long rigid, inclined wall members 44 and 46, each of which extends nearly the full length of plate 40. The wall member 44 may be referred to as the inner wall member, whereas that denoted 46 may be considered the outer wall member. The lower edges of wall members 44 and 46 may be welded or otherwise fixed upon support plate 40. An upper support plate 48, which may be similar to plate 40, overlies and is securely fixed upon the upper edges of wall members 44 and 46. Thus, a very rigid structure is formed by plates 40, 48 and wall members 44 and 46 to support a conveyor C, and this structure rests upon a line of posts 30. Said structure also is supported by the inclined headers 34, to which the upper plate 48 may be welded or otherwise fixedly secured.

The conveyor support structure just described is duplicated at the opposite side of the framework, that is, at the opposite side of a vertical plane which bisects the machine lengthwise. The two conveyor support structures may be identical, as are also the conveyors C, C supported thereon. Therefore, a description of one will suffice for the other also.

Reverting to FIG. 4, it is noted that the conveyor C which is made up of wood slats 18, receives support from the inner and outer walls 44 and 46. Each slat 18 carries a fixed upper bracket 50 and a fixed lower bracket 52. These brackets 50 and 52, along with similar brackets applied to all the conveyor slats 18, support certain links of the upper and lower endless chains 54 and 56 which form part of each conveyor C. The chain links at the brackets 50 and 52 interrelate, respectively, with the teeth of upper and lower sprockets 20, 20, which are carried by shafts S at opposite ends of each conveyor C. The sprockets when driven, will therefore drive conveyor C. The links of the chains where supported by the brackets 50 and 52, may be in the form of rollers so as to have anti-friction engagement with sprockets 20, 20.

Between the brackets 50 and 52, the slat 18 may be provided with a plate carrying a follower, which may be in the form of a roller 60. The roller 60 is adapted to ride upon a shaft 62 which extends substantially the full length of wall member 46 and is fixed thereon. As shown, the shelf 62 is a long horizontal angle iron, and two such are provided, one being fixed to each wall member 46 and 44. The rollers 60, riding upon the top of each shelf 62, prevent the conveyor reaches from sagging beneath the level of plate 40.

The inner wall member 44 carries two elongate track members 64 and 66 upon which the chain links 54 and 56 may ride, to sustain the weight of the animal according to FIG. 4, where the hoofs are unsupported. The track members may extend nearly the full length of the inside conveyor reach 10 or 12, and will preferably be of a structural shape which is highly rigid, the channel shape being shown by way of example. The track members will be fixed to the inner wall member 44, in spaced parallelism and will impart great structural strength thereto.

At the entry end of the apparatus, shown at the left in FIG. 1, stationary guards or shields 68 may be supported part way around the ends of the conveyors C, C, for guiding the living animal into the apparatus without injury to the hide in the event that the animal hesitates to proceed at the entrance. At the discharge end of the apparatus, shown at the right in FIG. 1, the roller conveyor 16 may be attached as by means of an adjustable tie bar 70, to convey from the apparatus the limp body of the animal released by conveyors C, C.

In normal use of the apparatus, an animal of the larger kind, such as a steer or cow, is driven on the hoof onto the elevated portion 8 of the runway, to approach the entrance, which has the appearance of FIG. 2. At the entrance, the animal will walk along the elevated portion of the runway without receiving any support from the conveyors C, C. However, as the animal advances and progresses along the downwardly inclined section 14 of the runway, its belly will gradually receive support at opposite sides, until eventually, the full weight of the animal will be borne by the moving conveyor reaches 10, 12. While so supported, the hoofs of the animal will be in suspension, making jumping impossible and rendering the animal completely helpless. During this period, the animal may easily and accurately be stunned, or struck, or otherwise treated in the course of advancement, without risk of injury to the butcher or other attendant.

By the time the animal reaches the conveyor 16, it is limp or lifeless, and will simply fall onto the discharge conveyor. The discharge conveyor may be of any acceptable type, although as herein shown, it comprises two banks of freely rotatable rollers 72 and 74 arranged at an angle, according to FIG. 3. The roller 76 at the head of bank 72, may be made larger and stronger than the others, since it is likely to receive the greatest force of impact when the animal falls onto the discharge conveyor.

What is clamied is:

1. A restraining apparatus for incapacitating and conveying a large meat animal to a stunning or sticking station, and comprising in combination: an animal walkway along which an animal is directed on the hoof toward said station; a pair of spaced conveyor reaches disposed one at each side of the walkway at an elevation above the latter; means for advancing the conveyor reaches in a common direction toward said station, the distance between said conveyor reaches being less than the width of the animal at its belly; said walkway being at least in part inclined downwardly relative to the direction of advancement of the conveyor reaches, so that the walkway eventually becomes non-supportive of the weight of the animal, with transfer of the animal weight to the advancing conveyor reaches as the animal approaches the station aforesaid; inner frame means concurrently supporting said walkway and the lower edge of said conveyor reaches, said inner frame means comprising spaced upright posts having means on the upper ends thereof in operative supporting relationship with the lower edge of said conveyor reaches and means intermediate the ends thereof in operative supporting relationship with said walkway; and outer frame means spaced outwardly of said inner frame means and including spaced upright stanchions in operative supporting relationship at their upper ends with the upper edge of said conveyor reaches.

2. Apparatus as defined in claim 1, wherein the spaced reaches of the conveyor are inclined at an angle upwardly and outwardly relative to said walkway.

3. Apparatus as defined by claim 2, wherein the inclined part of the walkway is characterized by a gradual descent from the mean level of the conveyor reaches, so that the hoofs of the animal gradually leave the walkway while the advancing conveyor reaches assume the burden of the animal weight.

4. Apparatus as defined by claim 2, wherein the lowermost edges of the conveyor reaches are spaced apart a distance less than the overall width of the body of the animal.

5. Apparatus as defined by claim 3, wherein the lowermost edges of the conveyor reaches are spaced apart a distance less than the overall width of the body of the animal.

6. Apparatus as defined by claim 5, wherein the space between the lowermost edges of the conveyor reaches approximates the width of the animal at the knee joints.

7. Apparatus as defined by claim 2, wherein the span of the conveyor reaches at their lowermost points approximates the width of the animal at the knee joints.

8. Apparatus as defined by claim 3, wherein the conveyor reaches are approximately horizontal, and the inclined part of the walkway slopes gradually downwardly in the direction of the stunning or sticking station.

9. Apparatus as defined by claim 8, wherein the lowermost edges of the conveyor reaches are spaced apart a distance less than the overall width of the body of the animal, but greater than the width of the animal at the knee joints.

10. Apparatus as defined by claim 9, wherein the advancement of the conveyor reaches is performed at a common rate of speed.

11. Apparatus as defined by claim 1, wherein the advancement of the conveyor reaches is performed at a common rate of speed.

12. Apparatus as defined by claim 3, wherein the advancement of the conveyor reaches is performed at a common rate of speed.

13. A restraining apparatus for incapacitating and conveying a large meat animal to a stunning or sticking station, and comprising in combination: an animal walkway along which an animal is directed on the hoof toward said station; a pair of spaced conveyor reaches disposed one at each side of the walkway at an elevation above the latter; means for advancing the conveyor reaches in a common direction toward said station; means for transferring the full weight of the animal from the walkway to said conveyor reaches as the animal approaches the station aforesaid; inner frame means concurrently supporting said walkway and the lower edge of said conveyor reaches, said inner frame means comprising spaced upright posts having means on the upper ends thereof in operative supporting relationship with the lower edge of said conveyor reaches and means intermediate the ends thereof in operative supporting relationship with said walkway; and outer frame means spaced outwardly of said inner frame means and including spaced upright stanchions in operative supporting relationship at their upper ends with the upper edge of said conveyor reaches.

14. Apparatus as defined in claim 13, wherein the spaced reaches of the conveyor are inclined at an angle upwardly and outwardly relative to said walkway.

15. Apparatus as defined by claim 14, wherein a portion of the runway is inclined, and characterized by a gradual descent from the mean level of the conveyor reaches in the direction of said station.

16. Apparatus as defined by claim 15, wherein the lowermost edges of the conveyor reaches are spaced apart a distance less than the overall width of the body of the animal, but greater than the width of the animal at the knee joints.

17. Apparatus as defined by claim 16, wherein the advancement of the conveyor reaches is performed at a common rate of speed.

18. Apparatus as defined by claim 13, wherein the advancement of the conveyor reaches is performed at a common rate of speed.

References Cited

UNITED STATES PATENTS

| | | | |
|---|---|---|---|
| 252,112 | 1/1882 | Lowry et al. | 17—1 |
| 712,579 | 11/1902 | Nicholson et al. | 17—1 |

FOREIGN PATENTS

| | | | |
|---|---|---|---|
| 1,356,065 | 2/1964 | France | 17—1 |

LUCIE H. LAUDENSLAGER, Primary Examiner